United States Patent
Tsirkin et al.

(10) Patent No.: US 9,569,241 B2
(45) Date of Patent: Feb. 14, 2017

(54) SHARING DEVICES ASSIGNED TO VIRTUAL MACHINES USING RUNTIME EXCLUSION

(71) Applicant: Red Hat Israel, Ltd., Ra'anana (IL)

(72) Inventors: Michael Tsirkin, Ra'anana (IL); Alex Williamson, Fort Collins, CO (US)

(73) Assignee: Red Hat Israel, Ltd., Ra'anana (IL)

( * ) Notice: Subject to any disclaimer, the term of this patent is extended or adjusted under 35 U.S.C. 154(b) by 734 days.

(21) Appl. No.: 13/774,892

(22) Filed: Feb. 22, 2013

(65) Prior Publication Data

US 2014/0245291 A1    Aug. 28, 2014

(51) Int. Cl.
*G06F 9/455* (2006.01)

(52) U.S. Cl.
CPC . *G06F 9/45558* (2013.01); *G06F 2009/45579* (2013.01)

(58) Field of Classification Search
CPC .................................................. G06F 9/45558
See application file for complete search history.

(56) References Cited

U.S. PATENT DOCUMENTS

| | | | | |
|---|---|---|---|---|
| 8,910,152 B1* | 12/2014 | Hyser | .................. | G06F 9/45558 718/1 |
| 2007/0124608 A1* | 5/2007 | Knowlson et al. | ............ | 713/300 |
| 2009/0172667 A1* | 7/2009 | Wang | ..................... | G09G 5/363 718/1 |
| 2009/0178033 A1* | 7/2009 | Challener | ........... | G06F 9/45537 717/168 |
| 2010/0106881 A1* | 4/2010 | Daniel | .......................... | 710/313 |
| 2010/0211717 A1* | 8/2010 | Uehara et al. | ................ | 710/316 |
| 2010/0250824 A1* | 9/2010 | Belay | .................. | G06F 9/45558 711/6 |
| 2010/0325261 A1* | 12/2010 | Radhakrishnan et al. | .... | 709/224 |
| 2012/0016970 A1* | 1/2012 | Shah et al. | .................... | 709/220 |
| 2012/0042033 A1* | 2/2012 | Ayala et al. | .................. | 709/216 |
| 2012/0240112 A1* | 9/2012 | Nishiguchi | ......... | G06F 9/45558 718/1 |
| 2012/0246644 A1* | 9/2012 | Hattori et al. | ..................... | 718/1 |
| 2013/0055254 A1* | 2/2013 | Avasthi et al. | ................... | 718/1 |
| 2013/0160012 A1* | 6/2013 | Ganguly et al. | ................. | 718/1 |
| 2014/0006659 A1* | 1/2014 | Foong et al. | ................... | 710/74 |
| 2014/0082612 A1* | 3/2014 | Breitgand et al. | ............... | 718/1 |
| 2014/0196034 A1* | 7/2014 | Amano et al. | .................... | 718/1 |

* cited by examiner

*Primary Examiner* — Emerson Puente
*Assistant Examiner* — Charlie Sun
(74) *Attorney, Agent, or Firm* — Haynes and Boone, LLP

(57) ABSTRACT

An example system and method of sharing a device assigned to a plurality of virtual machines includes identifying a first virtual machine in which a device is active. When a condition is satisfied, control of the device is transferred from the first virtual machine to a second virtual machine. Transferring control of the device includes sending a first communication to cause the first virtual machine to relinquish control of the device based on an indication that power will be removed from the device and further to cause the virtual machine to save first state information maintained by the first virtual machine to a first memory. The first state information is associated with the device. Transferring control of the device also includes saving second state information maintained by a host machine to a second memory. The second state information is associated with the first virtual machine and device.

26 Claims, 5 Drawing Sheets

9,569,241 B2

SHARING DEVICES ASSIGNED TO VIRTUAL MACHINES USING RUNTIME EXCLUSION

BACKGROUND

The present disclosure generally relates to a computing system, and more particularly to sharing devices in a virtual environment.

A virtual machine is a portion of software that, when executed on appropriate hardware, creates an environment allowing the virtualization of an actual physical computer system. Each virtual machine may function as a self-contained platform, running its own operating system (OS) and software applications (processes).

A host machine (e.g., computer or server) is typically enabled to simultaneously run one or more virtual machines, where each virtual machine may be used by a local or remote client. The host machine allocates a certain amount of the host's resources to each of the virtual machines. Each virtual machine may use the allocated resources to execute applications, including operating systems known as guest operating systems. The hypervisor virtualizes the underlying hardware of the host machine or emulates hardware devices, making the use of the virtual machine transparent to the guest operating system or the remote client that uses the virtual machine. Typically, a hypervisor manages allocation and virtualization of computer resources and performs context switching, as may be necessary, to cycle between various virtual machines.

BRIEF SUMMARY

This disclosure relates to sharing a device assigned to a plurality of virtual machines running on a host machine. Methods, systems, and techniques for sharing a device assigned to a plurality of virtual machines running on a host machine are provided.

According to an embodiment, a system for sharing a device assigned to a plurality of virtual machines includes a plurality of virtual machines. The example system also includes an identification module that identifies a first virtual machine in which a device is active. The device is active in only one of the plurality of virtual machines at a time, and the first virtual machine controls the device. The example system further includes a transfer module that communicates with the plurality of virtual machines and that, when a condition is satisfied, transfers control of the device from the first virtual machine to a second virtual machine. The second virtual machine is in the plurality of virtual machines. The transfer module includes a control module that sends a communication to the first virtual machine to cause (i) the first virtual machine to relinquish control of the device based on an indication that power will be removed from the device, and (ii) the first virtual machine to save first state information maintained by the first virtual machine to a first memory. The first state information is associated with the device. The transfer module also includes a state module that saves second state information maintained by a host machine to a second memory. The second state information is associated with the first virtual machine and device.

According to another embodiment, a method of sharing a device assigned to a plurality of virtual machines includes identifying a first virtual machine in which a device is active. The device is active in only one of the plurality of virtual machines at a time, and the first virtual machine controls the device. The method also includes when a condition is satisfied, transferring control of the device from the first virtual machine to a second virtual machine. The second virtual machine is in the plurality of virtual machines. Transferring control of the device from the first virtual machine to the second virtual machine includes sending a communication to cause (i) the first virtual machine to relinquish control of the device based on an indication that power will be removed from the device, and (ii) the first virtual machine to save first state information maintained by the first virtual machine to a first memory. The first state information is associated with the device. Transferring control of the device from the first virtual machine to the second virtual machine also includes saving second state information maintained by a host machine to a second memory. The second state information is associated with the first virtual machine and device.

According to another embodiment, a non-transitory machine-readable medium includes a plurality of machine-readable instructions that when executed by one or more processors are adapted to cause the one or more processors to perform a method including identifying a first virtual machine in which a device is active, the device being active in only one of the plurality of virtual machines at a time, and where the first virtual machine controls the device; and when a condition is satisfied, transferring control of the device from the first virtual machine to a second virtual machine, the second virtual machine being in the plurality of virtual machines. Transferring control of the device from the first virtual machine to a second virtual machine includes sending a communication to cause (i) the first virtual machine to relinquish control of the device based on an indication that power will be removed from the device, and (ii) the first virtual machine to save first state information maintained by the first virtual machine to a first memory, the first state information being associated with the device; and saving second state information maintained by a host machine to a second memory, the second state information being associated with the first virtual machine and device.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

Figure 1:
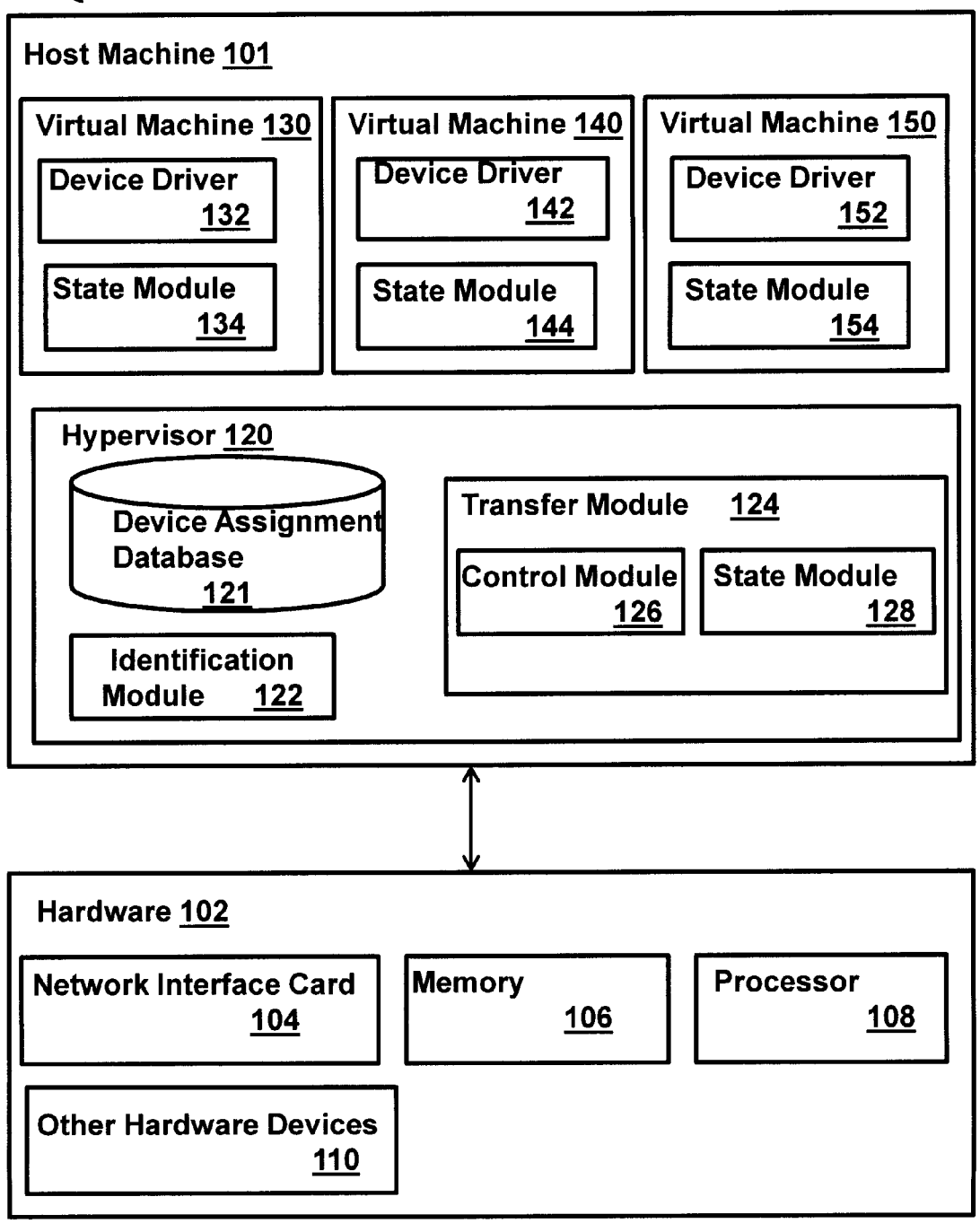
FIG. 1 is a simplified block diagram illustrating a system for sharing a device assigned to a plurality of virtual machines, according to an embodiment.

I. Overview
II. Example Host Machine to Transfer Control of a Device Between VMs
   A. Device is Active in a VM
   B. Transfer Control of the Device
      1. Relinquish Control of the Device Based on an Indication that Power Will be Removed From the Device
      2. Device State Information Maintained by the VM and the Host Machine
III. Modes
IV. Example Methods
V. Example Computing System
I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

The hypervisor may assign a device to a virtual machine (VM) running on a host machine. Typically, when the device is assigned to a VM, the device cannot be assigned to another VM and can only be used exclusively by the VM to which the device is assigned. In particular, the device may be assigned to a first VM. Using a conventional technique to assign the device to a second VM, the host machine may be suspended, the first VM may be shut down, and then the device may subsequently be assigned to the second VM. Using another conventional technique to assign the device to a second VM, the first VM may be shut down and then the device may subsequently be assigned to the second VM. These options, however, may be time consuming. For example, restarting the first VM (e.g., after the first VM has been shut down) when the device is reassigned back to the first VM may be time consuming. Similarly, restarting the second VM (e.g., after the second VM has been shut down) when the device is reassigned back to the second VM may be time consuming.

Further, a device assigned to a VM is associated with a state. When the VM is shut down, the state information maintained by the VM and associated with the device may be lost. In a virtual environment, some state information runs through the actual hardware device, and some state information does not run through the actual hardware device and is instead simulated in the hypervisor. Accordingly, the host machine may maintain device state information and the VM may maintain its own device state information. The device state information maintained by the host machine may be different from the device state information maintained by the VM. An example of device state information maintained by the host machine is a physical address space of the device, and an example of device state information maintained by the VM is a virtual address space of the device.

It may be desirable to allow a device to be cooperatively shared by a plurality of VMs such that the device is assigned to the plurality of VMs at the same time and switchable between the plurality of VMs. It may also be desirable to allow the device to be switched from a first assigned VM to a second assigned VM without suspending the host machine or shutting down the first VM. For instance, the first VM may save the device state information maintained by the first VM and then restore the device state information, resuming use of the device based on the saved state information.

This disclosure provides a technique in which a device may be assigned to a plurality of VMs at the same time and switched between the plurality of VMs. Further, the switching may be implemented without suspending the host machine or shutting down the VMs.

II. Example Host Machine to Transfer Control of a Device Between VMs

FIG. 1 is a simplified block diagram illustrating a system 100 for sharing a device assigned to a plurality of VMs, according to an embodiment.

System 100 includes a host machine 101 coupled to hardware 102. Examples of hardware devices are network interface card (NIC) 104, memory 106, processor 108, and other hardware devices 110. A host machine may run one or more VMs that run applications and services. Host machine 101 includes a hypervisor 120, a VM 130, a VM 140, and a VM 150. Hypervisor 120 may provide VM 130, 140, 150 with access to hardware devices to perform input/output (I/O).

VM 130 runs a guest operating system (OS) that may be different from another guest OS system running in VM 140 or VM 150 and may also be different from the host OS running on host machine 101 (not shown). The host or guest OS may include, for example, MICROSOFT WINDOWS®, LINUX®, SOLARIS®, and MAC® OS. Trademarks are the property of their respective owners. VM 130, 140, 150 may execute a device driver 132, 142, 152 that communicates directly with hardware devices without mediation from hypervisor 120.

VM 130, 140, 150 also includes a state module 134, 144, 154 that manages the state of the devices assigned to VM 130, 140, 150. State module 134 saves state information maintained by VM 130 to memory (e.g., virtual memory or a virtual disk). Similarly, state module 144 saves state information maintained by VM 140 to memory (e.g., virtual memory or a virtual disk). Similarly, state module 154 saves state information maintained by VM 150 to memory (e.g., virtual memory or a virtual disk).

A device may be assigned to a plurality of VMs. In an example, hypervisor 120 may assign NIC 104 to VMs 130, 140, and 150. VMs 130, 140, and 150 may use NIC 104 to receive and send data over a network. Any VM to which a device is assigned may be capable of controlling the device. In an embodiment, NIC 104 may be active in and controlled by at most one of VMs 130, 140, and 150 at any point in time. Further, VMs 130, 140, and 150 may maintain state information associated with NIC 104, such as pending interrupts, received packets, and packets to be sent to another network interface, and save the state information associated with NIC 104 to memory.

A. Device is Active in a VM

Referring to FIG. 1, hypervisor 120 includes an identification module 122 that may identify a VM in which a device is active. In an embodiment, the device is active in only one of the plurality of VMs at a time, and the VM in which the device is active controls the device. In this way, conflicts between different VMs to which the device is assigned may be avoided. In an example, a VM that controls the device interacts with the device and may send the device communication regarding, for example, tasks to complete. Interacting with the device may include using the device or sending data to and receiving data from the device. When the VM is no longer in control of the device, the VM may stop interacting with the device.

Hypervisor may maintain assignment information of a device assigned to a plurality of VMs in a device assignment database 121. In an example, identification module 122 identifies VM 130 as the VM having control of NIC 104.

Figure 2:
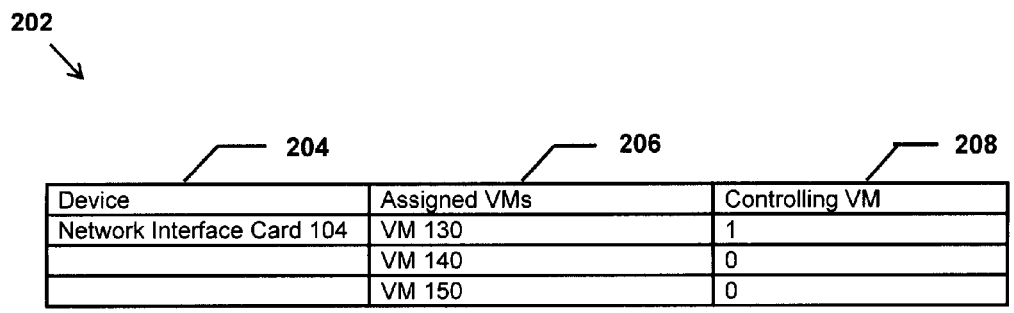
FIG. 2 is an illustration of a table in a device assignment database storing device assignment information, according to an embodiment.

FIG. 2 is an illustration of a table 202 in device assignment database 121 storing assignment information of NIC 104, according to an embodiment. Table 202 includes a device column 204, an assigned VMs column 206, and a controlling VM column 208. Device column 204 includes assignment information pertaining to NIC 104. Assigned VMs column 206 includes VMs 130, 140, and 150, and NIC 104 is assigned to VMs 130, 140, and 150. A controlling VM column 208 specifies which VM of the plurality of VMs has control of the device. A "1" may indicate that the VM in the corresponding row has control of the device, and a "0" may indicate that the VM in the corresponding row does not have control of the device. If no VMs have control of the device, controlling VM column 208 may include all zeros. It should be understood that another system may store this information in a different manner. For example, in another embodiment, a "0" may indicate that the VM in the corresponding row has control of the device, and a "1" may indicate that the VM in the corresponding row does not have control of the device. In another embodiment, a "Y" may indicate that the VM in the corresponding row has control of the device, and an "N" may indicate that the VM in the corresponding row does not have control of the device.

Hypervisor 120 may implement a dummy device to handle attempts to access the device from VMs in which the device is inactive or not active. In an example, VM 140 may attempt to send a request to the device, and a dummy device corresponding to the device may send a communication to the requesting VM, VM 140, that it does not have control of the device and to further request that control of the device be transferred from the controlling VM to the requesting VM.

B. Transfer Control of the Device

Hypervisor 120 includes a transfer module 124 that may communicate with the plurality of VMs. In an embodiment, when a condition is satisfied, transfer module 124 transfers control of the device from a first VM to a second VM. The first and second VMs are of the plurality of VMs.

The condition may be satisfied in various ways. In an example, the condition is satisfied based on the second VM sending a request to access the device. For instance, the second VM may send the request to access the device to the first VM or to the hypervisor. If the first VM receives from the second VM the request to access the device, the first VM may perform various actions. For example, the first VM may relinquish control of the device, send a communication to the hypervisor requesting removal of power from the device, or send a communication to the hypervisor indicating that the second VM has requested access to the device. In another example, the condition is satisfied based on a user request. For instance, the user may enter an input that requests control to be transferred from the first VM to the second VM. In another example, when a threshold period of time elapses, the condition is satisfied. For instance, a VM may agree to have control of the device for the threshold period of time, and when the threshold period of time elapses relinquish control of the device. In another example, each time a threshold period of time elapses, the condition is satisfied. For instance, the device may be active in and controlled by a particular VM in slices of time, and control may selectively be transferred between VM 130, VM 140, and VM 150. More specifically, the device may be active in and controlled by VM 130 for a first period of time. Once the first period of time elapses, control may be transferred to VM 140, and the device may be active in and controlled by VM 140 for a second period of time. Similarly, once the second period of time elapses, control may be transferred to VM 150, and the device may be active in and controlled by VM 150 for a third period of time. Similarly, once the third period of time elapses, control may be transferred back to VM 130, and the device may be active in and controlled by VM 130 for the first period of time. Each of the first, second, and third periods of time may be the same or different from one another.

Transfer module 124 may update device assignment database 121. In an example, after control of the device is transferred from VM 130 to VM 140, transfer module 124 may update device assignment database 121 such that VM 140 is specified as the VM having control of the device rather than VM 130.

Figure 3:
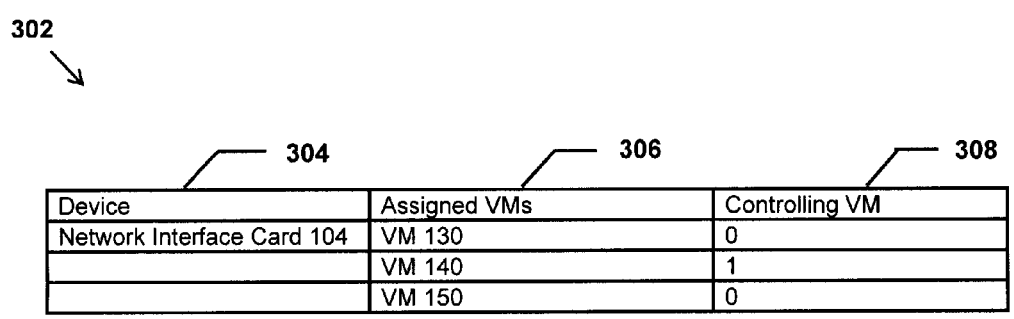
FIG. 3 is an illustration of a table in the device assignment database after control has been transferred from a virtual machine to another virtual machine, according to an embodiment.

FIG. 3 is an illustration of a table 302 in device assignment database 121 after control has been transferred to VM 140, according to an embodiment. Table 302 includes a device column 304, an assigned VMs column 306, and a controlling VM column 308. In the first row of table 302, controlling VM column 308 includes a "0," indicating that VM 130 does not have control of NIC 104. Similarly, in the third row of table 302, controlling VM column 308 includes a "0," indicating that VM 150 does not have control of NIC 104. In contrast, in the second row of table 302, controlling VM column 308 includes a "1," indicating that VM 140 has control of NIC 104.

1. Relinquish Control of the Device Based on an Indication that Power Will be Removed From the Device Transfer module 124 includes a control module 126 and a state module 128. Continuing with the above example of the device being active in the first VM, control module 126 may send a communication to the first VM to cause the first VM to relinquish control of the device based on an indication that power will be removed from the device.

In an example, after the first VM relinquishes control of the device the first VM stops interacting with the device. For example, the first VM may stop sending data to and receiving data from the device (e.g., to complete a task). In another example, after the first VM relinquishes control of the device the VM may no longer be able to communicate with the device without performing an additional action (e.g., requesting control of the device). When the first VM no longer controls the device and transfer module 124 receives a request by the first VM to access the device, transfer module 124 denies the request by the first VM to access the device.

An indication that power will be removed from the device may be indicated in various ways. In an example, an indication that power will be removed from the device results from control module 126 sending a request to the first VM to remove power from the device. The request to the first VM to remove power from the device may be an indication that power will be removed from the device. Accordingly, in response to the request to remove power from the device, the VM may relinquish control of the device. Control module 126 may receive from the first VM, in response to the request to remove power from the device, an indication that the first VM machine has relinquished control of the device. In another example, control module 126 may send a request to the first VM to enter a suspend mode. In response to the request to enter the suspend mode, the first VM may send a request to remove power from the device. Control module 126 may receive from the first VM, in response to the request to enter the suspend mode, a request to remove power from the device. The request to remove power from the device sent by the VM may be an indication that power will be removed from the device. Accordingly, in response to control module 126 sending the request to remove power from the device, the VM may relinquish control of the device. In response to the indication that the VM has relinquished control of the device, control module 126 may prevent access by the VM to the device. If the VM tries to illegally access the device after control has been transferred to another VM, the hypervisor may detect the illegal access and deny it.

The device may be associated with memory regions that are mapped to the VM. Memory 106 may include a memory region that is mapped to the device assigned to VM 130. The device may make use of memory regions that allow the processor to interact with the device via reads and writes to memory 106. The memory regions may be implemented in different ways depending on the architecture and platform (e.g., Memory Mapped I/O (MMIO) or I/O port regions).

In an embodiment, the hypervisor may directly map the device in guest memory to the VM that controls the device. If control of the device is transferred from a first VM to a second VM, state module 128 saves the state information maintained by the host machine. Before state module 128 saves the state information maintained by the host machine, the hypervisor may remove the direct mapping of the device from guest memory. When control of the device is transferred to the first VM, state module 128 may restore the state information maintained by the host machine. After state module 128 restores the state information maintained by the host machine, the hypervisor may restore the direct mapping of the device in guest memory.

In another example, the device may include a device register, and an indication that power will be removed from the device results from the device writing to its device register. For instance, control module 126 may send a communication to the first VM to cause the device active in the first VM write to the device's device register. The first VM may determine that the device has written to its device register. In response to the device writing to its device register, the first VM may send a request to remove power from the device. Control module 126 may receive from the first VM, in response to the communication that causes the device active in the first VM to write to the device's device register, a request to remove power based on the device register being written to. The request to remove power from the device sent by the VM may be an indication that power will be removed from the device. Accordingly, in response to sending the request to remove power from the device, the VM may relinquish control of the device.

In response to the indication that power will be removed from the device, hypervisor 120 may decide to remove power from the device or alternatively may decide to not remove power from the device. In an embodiment, power is not removed from the device. For example, the indication that power will be removed from the device may be sent to cause the first VM to relinquish control of the device and not to actually remove power from the device. Accordingly, if the hypervisor receives a request to remove power from the device (e.g., from a VM), the hypervisor may ignore the request.

In another embodiment, power is removed from the device. In an example, the hypervisor sends a communication to the host machine to cause the host machine to remove power from the device. Based on this communication, the host machine may remove power from the device (e.g., by switching the device to a no or a low power state). In another example, the VM sends a communication to the host machine to cause the host machine to remove power from the device. Based on this communication, the host machine may remove power from the device (e.g., by switching the device to a no or a low power state). At a later point in time, control module 126 may send a communication to the host machine that causes the host machine to restore power to the device. Based on this communication, the host machine may restore power to the device (e.g., by switching the device to a high power state).

Transfer module 124 may transfer control of the device from the first VM to the second VM such that the device is active in the second VM. Transfer module 124 may activate the device in the second VM. Additionally, transfer module 124 may also deactivate the device in the first VM such that the device is inactive in the first VM. Accordingly, when the first VM relinquishes control of the device, the device may become inactive in the first VM.

2. Device State Information Maintained by the VM and the Host Machine

As discussed above, control module 126 may send a communication to the first VM to cause the first VM to relinquish control of the device based on an indication that power will be removed from the device. The communication may further cause the first VM to save first state information maintained by the first VM to a first memory, where the first state information is associated with the device. At this point, the device state information maintained by the first VM is safe and stored in memory. Hypervisor 120 may ensure the state of the memory (e.g., virtual memory or a virtual disk) is consistent with the state that the memory was in when the device state information maintained by the first VM was saved. The saved device state information maintained by first VM may be restored in the future such that first VM may resume using the device based on the saved device state.

Similarly, hypervisor 120 may also maintain device state information. In particular, state module 128 may save state information maintained by the host machine to a memory. In an example, state module 128 saves second state information maintained by a host machine to a second memory. The second state information may be associated with the first VM and device. State module 128 may save the second state information after the first VM has saved the first state information. In an example, state module 128 may receive an indication that the first VM has saved the first state information, and after receiving the indication that the first VM has saved the first state information, may save the second state information to the second memory.

State module 128 may maintain device state information associated with one or more VMs running on the host machine. For example, state module 128 may maintain third state information that is associated with the second VM and device. State module 128 may also restore the saved third state information at a future point in time (e.g., when control is transferred back to the second VM).

Similarly, the second VM may maintain fourth state information that is associated with the device. In an example, control module 126 sends a communication to the second VM to cause the second VM to restore the fourth state information. Control module 126 may send this communication to the second VM based on the device becoming active in the second VM. In this way, the second VM may restore the fourth state information and resume using the device based on the fourth state information. State module 128 may restore the saved third state information maintained by the host machine before the second VM restores the fourth state information.

In an example, identification module 122 identifies the device as being active in the second VM. In this example, transferring control of the device from the second VM to the first VM may include control module 126 sending a communication to the second VM to cause the second VM to relinquish control of the device based on an indication that power will be removed from the device and to further cause the second VM to save the fourth device state information to a memory. After the fourth device state information is saved, state module 128 may save the third device state information maintained by the host machine to a memory. The device may then be active in the first VM and inactive in the second VM.

When control of the device is re-transferred back to the second VM from the first VM, state module 128 may restore the saved third state information, and control module 126 may send a communication to the second VM to cause the second VM to restore the saved fourth device state information. State module 128 may restore the third state information maintained by the host machine before the second VM restores the fourth state information maintained by the second VM. The device may then be active in the second VM and inactive in the first VM.

III. Modes

A VM or host machine may be in a mode such as a run mode, suspend mode, shutdown mode, sleep mode, or other modes.

In an embodiment, after control of the device is transferred from the first VM to the second VM, the second VM is in a mode different from a mode that the first VM is in. In an example, the device may be active in VM 130, and VM 130 may be in a run mode and VM 140 may be in a suspend mode. Based on the transfer of control of the device from VM 130 to VM 140, VM 130 may save device state information maintained by VM 130 and enter the suspend mode. It should be understood that VM 130 may save device state information maintained by VM 130 and then enter the suspend mode, or that VM 130 may enter the suspend mode and then save device state information maintained by VM 130.

In contrast, based on the transfer of control of the device from VM 130 to VM 140, VM 140 may restore device state information maintained by VM 140 and enter the run mode. It should be understood that VM 140 may restore device state information maintained by VM 140 and then enter the run mode, or that VM 140 may enter the run mode and then save device state information maintained by VM 140. Control module 126 may send a communication to VM 140 to cause VM 140 to enter the run mode. In an example, hypervisor 120 sends VM 140 a wake signal to notify VM 140 that it has control of the device and VM 140 exits the suspend mode and enters the run mode. In another example, hypervisor 120 causes an interrupt to wake up VM 140. The interrupt may cause VM 140 to enter the run mode. Thus, after control of the device is transferred from VM 130 to VM 140, VM 130 may be in the suspend mode and VM 140 may be in the run mode.

Further, a time period in which the first VM is in the suspend mode may overlap with a time period in which the device is active in the second VM. Accordingly, transferring control of the device from VM 130 to VM 140 may be done without shutting down VM 130. Moreover, after control of the device is transferred from VM 130 to VM 140 the host machine may be in a mode different from the shutdown mode.

In another embodiment, after control of the device is transferred from the first VM to the second VM, the first and second VMs are in a common mode. In an example, the device may be active in VM 130, and VMs 130 and 140 may be in a run mode. Based on the transfer of control of the device from VM 130 to VM 140, VM 130 may save device state information maintained by VM 130 and remain in the run mode. Similarly, based on the transfer of control of the device from VM 130 to VM 140, VM 140 may restore device state information that was previously saved and remain in the run mode. Accordingly, after control of the device is transferred from VM 130 to VM 140, VMs 130 and 140 may both be in the run mode. Moreover, after control of the device is transferred from VM 130 to VM 140 the host machine may be in a mode different from the shutdown mode.

As discussed above and further emphasized here, FIG. 1 is merely an example, which should not unduly limit the scope of the claims. For example, although block diagram 100 is described herein with reference to three VMs, host machine 101 may run fewer than three or more than three VMs without departing from the spirit and scope of the disclosure. Further, it should be understood that other hardware devices may also be used by host machine 101 or VMs 130, 140, and 150.

Further, each of identification module 122, transfer module 124, control module 126, and state module 128 may include one or more modules. In an example, identification module 122 may be split into a first identification module and a second identification module. Moreover, identification module 122, transfer module 124, control module 126, and state module 128 may be incorporated into the same module.

IV. Example Methods

Figure 4:
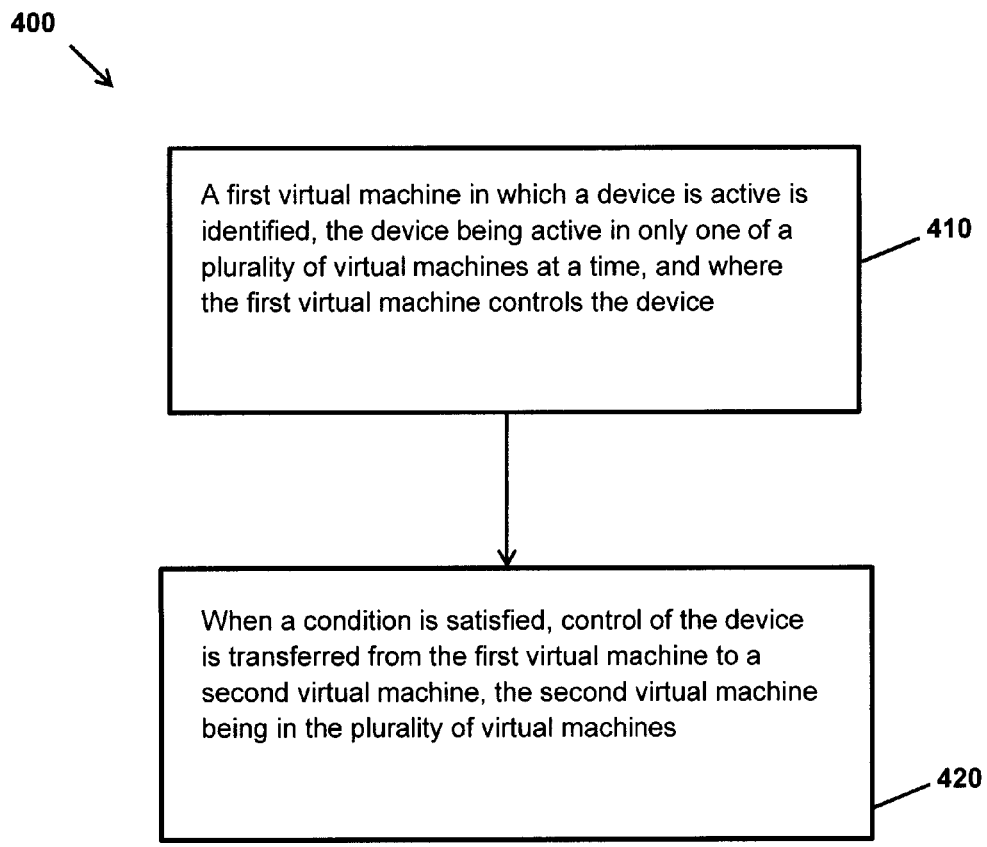
FIG. 4 is a simplified flowchart illustrating a method of sharing a device assigned to a plurality of virtual machines, according to an embodiment.

FIG. 4 is a simplified flowchart illustrating an example method 400 of sharing a device assigned to a plurality of virtual machines. Method 400 is not meant to be limiting and may be used in other applications.

Method 400 includes steps 410-420. In a step 410, a first virtual machine in which a device is active is identified, the device being active in only one of the plurality of virtual machines at a time, and where the first virtual machine controls the device. In an example, identification module 122 identifies a first virtual machine in which a device is active, the device being active in only one of the plurality of virtual machines at a time, and where the first virtual machine controls the device. In an example, when the first VM controls the device and transfer module 124 receives a request by another VM to access the device, transfer module 124 denies the request by the other VM to access the device.

In a step 420, the request, when a condition is satisfied, control of the device is transferred from the first virtual machine to a second virtual machine, the second virtual machine being in the plurality of virtual machines. In an example, when a condition is satisfied, transfer module 124 transfers control of the device from the first virtual machine to a second virtual machine, the second virtual machine being in the plurality of virtual machines.

It is also understood that additional method steps may be performed before, during, or after steps 410-420 discussed above. For example, method 400 may include a step of sending a communication to the virtual machine to cause the virtual machine to suspend and further to cause the virtual machine to send the request to remove power from the device. It is also understood that one or more of the steps of method 400 described herein may be omitted, combined, or performed in a different sequence as desired.

Figure 5:
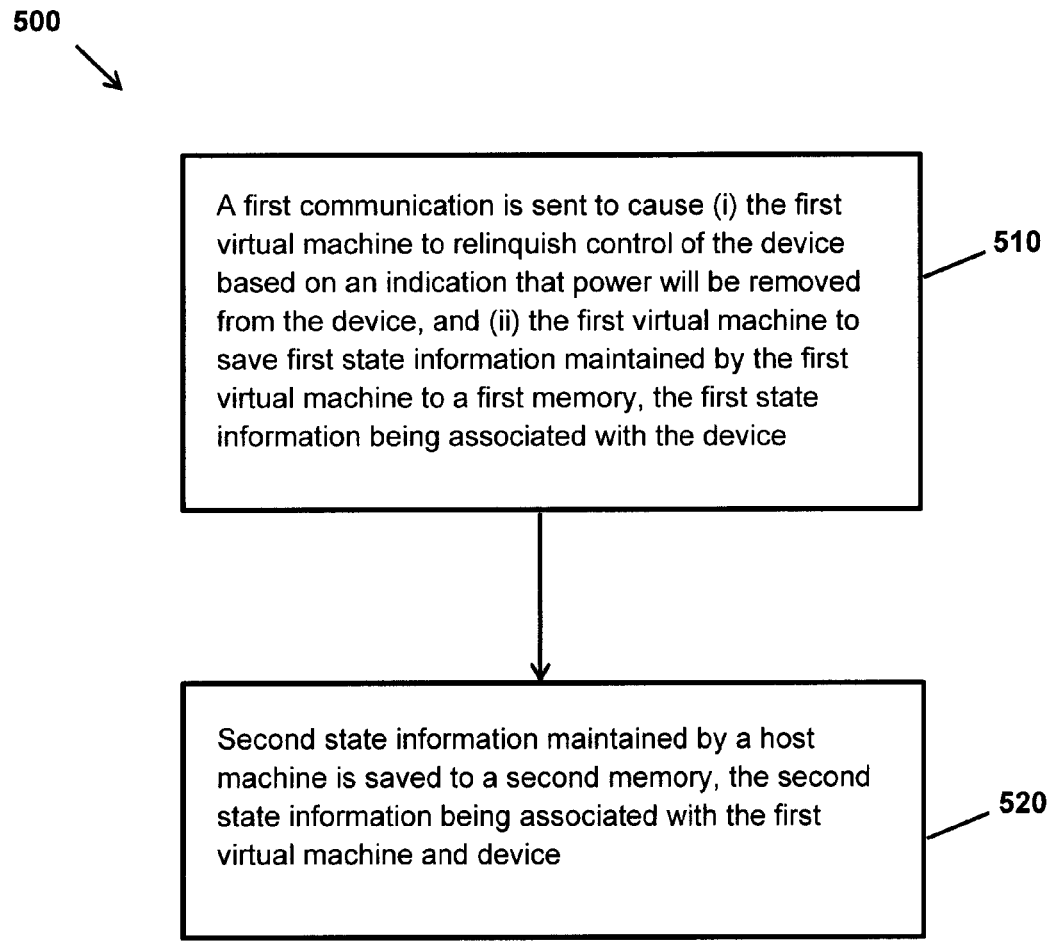
FIG. 5 is a simplified flowchart illustrating a method of transferring control of the device from the first virtual machine to a second virtual machine, according to an embodiment.

FIG. 5 is a simplified flowchart illustrating an example method 500 of transferring control of the device from the first virtual machine to a second virtual machine. Method 500 is not meant to be limiting and may be used in other applications.

In a step 510, when control of the device is transferred from the first virtual machine to a second virtual machine a first communication is sent to cause (i) the first virtual machine to relinquish control of the device based on an indication that power will be removed from the device, and (ii) the first virtual machine to save first state information maintained by the first virtual machine to a first memory, the first state information being associated with the device. In an example, control module 126 sends a first communication to cause (i) the first virtual machine to relinquish control of the device based on an indication that power will be removed from the device, and (ii) the first virtual machine to save first state information maintained by the first virtual machine to a first memory, the first state information being associated with the device. The first communication may further cause the first VM to save first state information maintained by the first VM to a first memory. The first state information may be associated with the device.

In a step 520, when control of the device is transferred from the first virtual machine to a second virtual machine second state information maintained by a host machine is saved to a second memory, the second state information being associated with the first virtual machine and device. In an example, state module 128 saves second state information maintained by a host machine to a second memory, the second state information being associated with the first virtual machine and device.

It is also understood that additional method steps may be performed before, during, or after steps 510-520 discussed above. For example, method 500 may include a step of updating device assignment database 121 to reflect the transfer of control of the device. It is also understood that one or more of the steps of method 500 described herein may be omitted, combined, or performed in a different sequence as desired.

V. Example Computing System

Figure 6:
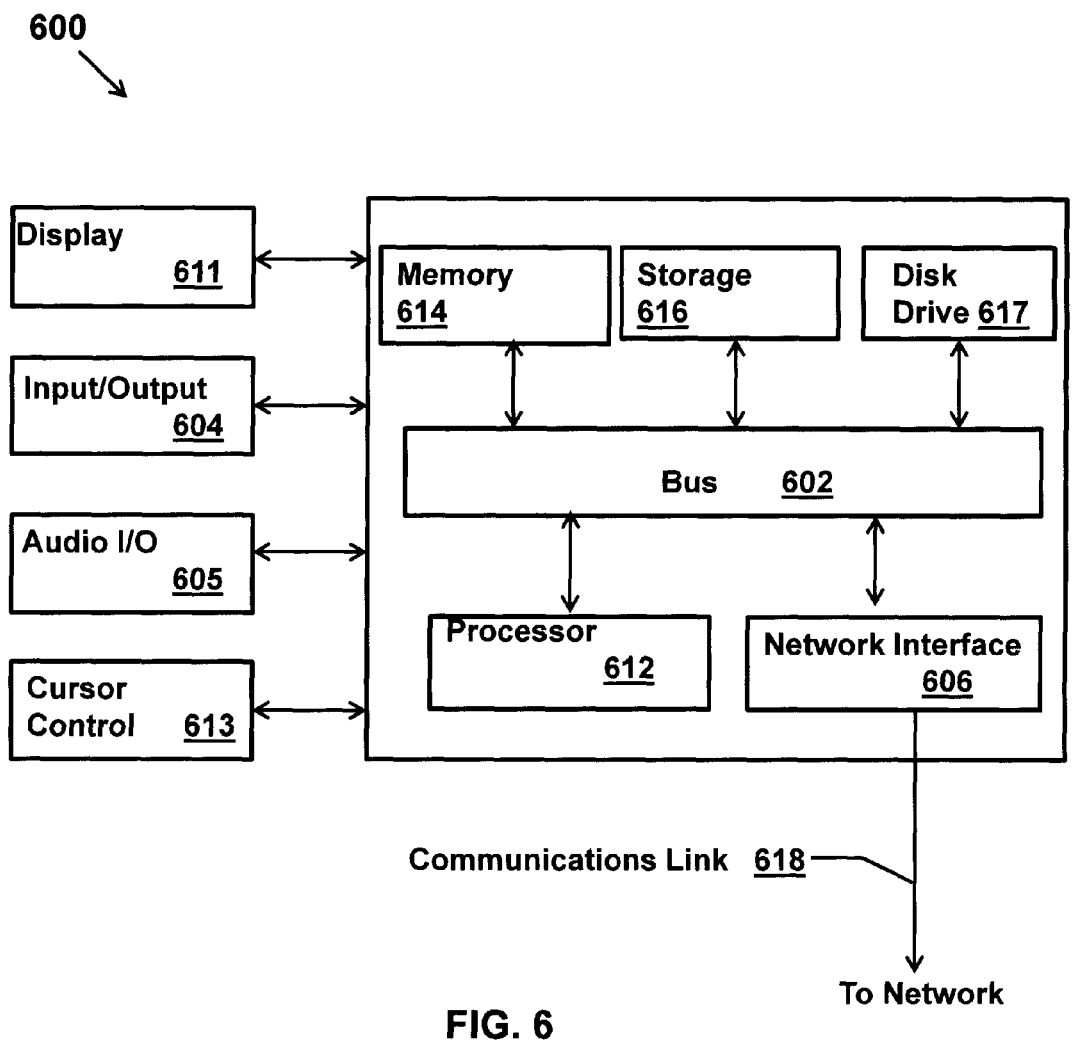
FIG. 6 is a block diagram of an electronic system suitable for implementing one or more embodiments of the present disclosure.

FIG. 6 is a block diagram of a computer system 600 suitable for implementing one or more embodiments of the present disclosure. In various implementations, host machine 101 may include a client or a server computing device. The client or server computing device may include one or more processors. The client or server computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable. A processor 612, which may be a microcontroller, digital signal processor (DSP), or other processing component, processes these various signals, such as for display on computer system 600 or transmission to other devices via communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims

What is claimed is:

1. A system for sharing a device assigned to a plurality of virtual machines, the system comprising:
   a plurality of virtual machines, wherein a device is assigned to the plurality of virtual machines and is active in only one of the plurality of virtual machines at a time; and
   a hypervisor that identifies a first virtual machine in which the device is active, wherein-the first virtual machine controls the device; and
   a first memory that stores first state information that is associated with the device and maintained by the first virtual machine;
   wherein the hypervisor communicates with the plurality of virtual machines and that, when a condition is satisfied, transfers control of the device from the first virtual machine to a second virtual machine, wherein the second virtual machine is in the plurality of virtual machines;
   wherein the hypervisor receives an indication to transfer control of the device from the first virtual machine to the second virtual machine, wherein in response to the indication to transfer control of the device, the hypervisor sends a first communication to the first virtual machine to cause (i) the first virtual machine to relinquish control of the device based on an indication that power will be removed from the device, and (ii) the first virtual machine to save the first state information to the first memory; and
   wherein the hypervisor receives an indication that the first virtual machine has saved the first state information, and after receiving the indication that the first virtual machine has saved the first state information, the hypervisor saves second state information maintained by a host machine to a second memory, wherein the second state information is associated with the first virtual machine and the device.

2. The system of claim 1, wherein the hypervisor sends a request to the first virtual machine to remove power from the device, and receives from the first virtual machine, in response to the request, an indication that the first virtual machine has relinquished control of the device, and wherein the device remains assigned to the first virtual machine after the first virtual machine relinquishes control of the device.

3. The system of claim 2, wherein the hypervisor transfers control of the device from the first virtual machine to the second virtual machine, wherein after the hypervisor transfers control from the first virtual machine to the second virtual machine, the device is active in the second virtual machine and inactive in the first virtual machine.

4. The system of claim 2, wherein in response to the indication that the first virtual machine has relinquished control of the device, the hypervisor prevents access by the first virtual machine to the device.

5. The system of claim 3, wherein the hypervisor sends a request to the first virtual machine to enter a suspend mode, and receives from the first virtual machine, in response to the request to the first virtual machine to enter the suspend mode, a request to remove power from the device, wherein a time period in which the first virtual machine is in the suspend mode overlaps with a time period in which the device is active in the second virtual machine.

6. The system of claim 1, wherein the hypervisor saves third state information maintained by the host machine, the third state information is associated with the second virtual machine and device, and the hypervisor restores the saved third state information.

7. The system of claim 6, wherein the hypervisor sends a second communication to the second virtual machine to cause the second virtual machine to restore fourth state information, and the fourth state information is maintained by the second virtual machine and is associated with the device.

8. The system of claim 7, wherein the hypervisor restores the third state information maintained by the host machine before the fourth state information is restored.

9. The system of claim 7, wherein when the device is active in the first virtual machine, the second virtual machine is in a suspend mode, and the hypervisor sends a third communication to the second virtual machine to cause the second virtual machine to enter a run mode.

10. The system of claim 1, wherein the first state information is different from the second state information.

11. The system of claim 1, wherein the device is associated with a device register and the hypervisor receives from the first virtual machine, in response to the first communication, a request to remove power based on the device register being written to.

12. The system of claim 1, wherein when the hypervisor receives a request from the second virtual machine to access the device, the condition is satisfied, and wherein the device is assigned to the plurality of virtual machines at the same time.

13. The system of claim 1, wherein when the first virtual machine controls the device and the hypervisor receives a request by the second virtual machine to access the device, the hypervisor denies the request by the second virtual machine to access the device.

14. The system of claim 13, wherein the hypervisor directly maps the device associated with guest memory to a virtual machine that controls the device.

15. The system of claim 14, wherein before the hypervisor saves the second state information maintained by the host machine, the hypervisor removes a direct mapping of the device from the guest memory, and after the hypervisor restores the second state information maintained by the host machine, the hypervisor restores the direct mapping of the device in guest memory.

16. A method of sharing a device assigned to a plurality of virtual machines, the method comprising:
   identifying a first virtual machine in which a device is active, the device being active in only one of a plurality of virtual machines at a time, and wherein the first virtual machine controls the device; and
   when a condition is satisfied, transferring control of the device from the first virtual machine to a second virtual machine, the second virtual machine being in the plurality of virtual machines, wherein the transferring comprises:
      sending, by a hypervisor, a first communication to cause (i) the first virtual machine to relinquish control of the device based on an indication that power will be removed from the device, and (ii) the first virtual machine to save first state information maintained by the first virtual machine to a first memory, the first state information being associated with the device;
      receiving an indication that the first virtual machine has saved the first state information; and
      after receiving the indication that the first virtual machine has saved the first state information, saving second state information maintained by a host machine to a second memory, the second state information being associated with the first virtual machine and the device.

17. The method of claim 16, wherein sending the first communication comprises sending a request to remove power from the device, and receiving, in response to the sending a request to remove power from the device, an indication that the first virtual machine has relinquished control of the device.

18. The method of claim 17, further comprising transferring control of the device from the first virtual machine to the second virtual machine, wherein after the transferring, the device is active in the second virtual machine and inactive in the first virtual machine.

19. The method of claim 18, wherein after the transferring control of the device from the first virtual machine to the second virtual machine, the second virtual machine is in a mode different from a shutdown mode.

20. The method of claim 17, further comprising:
   in response to the indication that the first virtual machine has relinquished control of the device, preventing access by the first virtual machine to the device, wherein after the first virtual machine has relinquished control of the device, the device remains assigned to the virtual machine.

21. The method of claim 16, wherein the sending a first communication comprises sending a request to the first virtual machine to enter a suspend mode, the request to the first virtual machine to enter the suspend mode being an indication that power will be removed from the device, and a time period in which the first virtual machine is in the suspend mode overlapping with a time period in which the device is active in the second virtual machine.

22. The method of claim 21, wherein in response to the request to enter the suspend mode, receiving from the first virtual machine a request to remove power from the device.

23. The method of claim 16, further comprising transferring control of the device from the second virtual machine to the first virtual machine, wherein transferring control of the device from the second virtual machine to the first virtual machine comprises:
   sending a second communication to cause (i) the second virtual machine to relinquish control of the device based on a second indication that power will be removed from the device, and (ii) the second virtual machine to save third state information maintained by the second virtual machine to a third memory, the third state information being associated with the device;
   saving fourth state information maintained by the host machine to a fourth memory, the fourth state information being associated with the second virtual machine and device;
   restoring the second state information maintained by the host machine;
   sending a third communication to the first virtual machine to cause the first virtual machine to restore the first state information; and
   activating the device in the first virtual machine.

24. The method of claim 16, further comprising sending a communication that causes power to be removed from the device.

25. The method of claim 16, further comprising sending a communication that causes power to be restored to the device.

26. A non-transitory machine-readable medium comprising a plurality of machine-readable instructions which when executed by one or more processors are adapted to cause the one or more processors to perform a method comprising:
   identifying a first virtual machine in which a device is active, the device being active in only one of a plurality of virtual machines at a time, and wherein the first virtual machine controls the device; and
   when a condition is satisfied, transferring control of the device from the first virtual machine to a second virtual machine, the second virtual machine being in the plurality of virtual machines, wherein the transferring comprises:
      sending, by a hypervisor, a first communication to cause (i) the first virtual machine to relinquish control of the device based on an indication that power will be removed from the device, and (ii) the first virtual machine to save first state information maintained by the first virtual machine to a first memory, the first state information being associated with the device; and
      receiving an indication that the first virtual machine has saved the first state information; and
      after receiving the indication that the first virtual machine has saved the first state information, saving second state information maintained by a host machine to a second memory, the second state information being associated with the first virtual machine and the device.

* * * * *